United States Patent [19]

Ikunaga et al.

[11] Patent Number: 4,778,527

[45] Date of Patent: Oct. 18, 1988

[54] ANTI-CORROSIVE COMPOSITION FOR IRON AND STEEL SURFACES AND THE USE THEREOF FOR PROTECTING THE REINFORCING STEEL BARS OF AUTOCLAVED LIGHT-WEIGHT CONCRETE

[75] Inventors: Takahisa Ikunaga, Yokohama; Maho Nakatsumi, Kanagawa, both of Japan

[73] Assignee: Internationella Siporex AB, Malmo, Sweden

[21] Appl. No.: 947,171

[22] Filed: Dec. 29, 1986

[51] Int. Cl.$^4$ .................. C04B 38/02; C04B 14/48
[52] U.S. Cl. .................. 106/87; 106/14.14; 106/14.24; 106/14.39; 106/14.41; 106/14.44; 106/99; 106/283; 427/409; 524/4; 428/389
[58] Field of Search ............... 106/14.14, 14.24, 14.39, 106/14.41, 283, 14.44, 87, 99; 427/409; 524/4; 428/389

[56] References Cited

U.S. PATENT DOCUMENTS

| | | | |
|---|---|---|---|
| 1,831,226 | 11/1931 | Byrd | 106/283 |
| 2,686,166 | 8/1954 | Taylor | 106/283 |
| 3,030,664 | 4/1962 | Wijard | 427/409 |

FOREIGN PATENT DOCUMENTS 1080283 12/1954 France.

*Primary Examiner*—Steven Capella
*Assistant Examiner*—David M. Brunsman
*Attorney, Agent, or Firm*—Fleit, Jacobson, Cohn & Price

[57] ABSTRACT

There is provided an anti-corrosive mixture for iron and steel surfaces which comprises (a) a mixture composed of 5 to 25% by weight (solid basis) of one or more kinds of aqueous emulsions or aqueous latices of styrene resin and 5 to 15% by weight (solid basis) of aqueous emulsion of asphalt, and (b) 60 to 90% by weight of at least one kind of inorganic powder selected from the group consisting of silica stone, silica sand, granite, andesite, shale, kaolin, feldspar, talc, mica, fly ash, slag, iron oxide and graphite. The inorganic powder may also contain 1 to 10% by weight of limestone powder. There is also provided a process for the manufacture of steam-cured aerated light-weight concrete while applying the above anti-corrosive mixture to the reinforcing steel bars used in that process.

6 Claims, No Drawings

ANTI-CORROSIVE COMPOSITION FOR IRON AND STEEL SURFACES AND THE USE THEREOF FOR PROTECTING THE REINFORCING STEEL BARS OF AUTOCLAVED LIGHT-WEIGHT CONCRETE

BACKGROUND OF THE INVENTION

1. Field of the Invention

The present invention relates to an anti-corrosive composition for iron and steel surfaces. Especially the composition is intended to be used for protecting the reinforcing bars of concrete. More particularly, the composition is to be used for the reinforcing bars of autoclaved light-weight concrete. The expression "light-weight concrete" includes aerated light-weight concrete, that is, light-weight concrete obtained by incorporating a gas-developing agent such as aluminium powder in the light-weight concrete raw mixture to cause the latter to expand after casting and so-called foamed light-weight concrete, that is, light-weight concrete obtained by foaming the raw material mixture before casting it. The invention is especially concerned with a composition for the reinforcing steel bars of autoclaved light-weight aerated concrete (abbreviated as ALC hereinafter). That type of light-weight concrete has usually a specific gravity of 0,4 to 1,2. The invention is also concerned with a process for the manufacture of steam-cured light-weight aerated concrete.

2. Description of the Prior Art

ALC is produced by mixing silicious raw materials and calcarious raw materials with water, incorporating the resulting mix with aluminium powder and other additives to make a slurry, pouring the slurry in a mould containing reinforcing steel bars, permitting the slurry to expand and to become half-plastic, cutting the half-plastic concrete into a desired shape using a piano wire or the like, and finally curing the cut concrete with steam in an autoclave.

ALC thus produced is a building material which is light in weight and superior in heat insulation and durability. However, it has a disadvantage that it contains pores accounting for about 80% of its volume and the pores permit moisture and corrosive substance to migrate through ALC so that to corrode the reinforcing steel bars.

For anti-corrosion, it has been a common practice to apply a proper anti-corrosive mixture to reinforcing steel bars. Conventional anti-corrosive materials are divided into three groups. (1) One which contains cement as the major component, (2) One which contains asphalt as the major component, (3) One which contains resin emulsion or latex as the major component.

The anti-corrosive mixture of the first group is most widely used because it is inexpensive, it produces good bond to both ALC and steel bars (simply referred as "bond" hereinafter), and it is moderately satisfactory in anti-corrosiveness. On the other hand, it has some disadvantages. For example, it is limited in pot life; it is liable to the variation of cement quality; it permits water to migrate; it forms an anti-corrosive coating poor in flexibility; and it is not easily applied to reinforcing steel bars thinner than 5 mm in diameter which are used for thin ALC panels, because of its poor flexibility.

The anti-corrosive mixture of the second group covers generally the deficiency of the one of the first group. However, it is still very poor in bond.

The anti-corrosive mixture of the third group has an advantage of having a long pot life and stable quality. However, it greatly varies in flexibility, bond and anti-corrosive performance depending on the type of emulsion or latex and mixing ratio of emulsion or latex and other additives. According to information disclosed so far, the anti-corrosive mixture of the third group is composed of a synthetic rubber, thermoplastic resin or thermosetting resin, and inorganic powder; a rubber latex, silica powder and lime; or a styrene-butadiene rubber latex and an inorganic substance such as kaolin and slaked lime. This anti-corrosive mixture has the following disadvantages. It costs more than conventional ones containing cement as the major component although it provides thinner coating for anti-corrosion, because it contains resin or latex in a comparatively large portion. It provides not always sufficient bond and flexibility, and its other disadvantage is formation of cracks in the relatively thicker part of coating. Therefore it is difficult to apply this anti-corrosive mixture of certain composition commonly both to reinforcing steel bars thicker than 5 mm for thick panels and to steel bars or nets of for instance 1–3 mm in thickness for thin panels, since in general the thicker the bars are, the thicker the coating may be.

In addition to the above-mentioned three groups of anti-corrosive mixtures, there are many known anti-corrosive mixtures containing a resin emulsion or latex and cement as the major component. Cement used in combination with a resin emulsion or latex inevitably shortens the pot life. On the other hand, there is disclosed a method of forming an anti-corrosive coating by applying different kinds of anti-corrosive coating in two layers, but this method has a disadvantage of making the process complex.

SUMMARY OF THE INVENTION

Accordingly, it is an object of the present invention to provide an anti-corrosive mixture for reinforcing steel bars of ALC which is free of the above-mentioned disadvantages.

The gist of the present invention resides in an anti-corrosive mixture for reinforcing steel bars of ALC which comprises (a) a component composed of 5 to 25% by weight (solid basis) of one or more kinds of aqueous emulsion or latices of styrene resin and 5 to 15% by weight (solid basis) of aqueous emulsion of asphalt, and (b) a component composed of 60 to 90% by weight of at least one kind of inorganic powder selected from the group consisting of silica stone, silica sand, granite, andesite, shale, kaolin, feldspar, talc, mica, fly ash, slag, iron oxide and graphite. The inorganic powder may also contain 1 to 10% by weight of limestone powder.

Although the invention is especially concerned with the provision of an anti-corrosive protective layer on reinforcing bars for the ALC it has also proved generally applicable for anti-corrosive protection of steel and iron surfaces. An object of the invention is therefore to provide an anti-corrosive mixture for such surfaces.

DETAILED DESCRIPTION OF THE INVENTION

One of the raw materials of the anti-corrosive mixtures of this invention is an aqueous emulsion or aqueous latex of styrene resin. Examples, of the styrene resin include polystyrene, styrene-butadiene, styrene-acrylonitrile resin, styrene rubber, polybutadiene-styrene and acrylonitrile-butadiene-styrene resin.

Another raw material is an aqueous emulsion of asphalt which is commercially available. These two emulsions are used together to make a component. The mixing ratio is 5 to 25% by weight (solid basis) for the aqueous emulsion of styrene resin and 5 to 15% by weight (solid basis) for the aqueous emulsion of asphalt. With the emulsion of styrene resin less than 5% by weight, the resulting anti-corrosive mixture is very poor in anti-corrosive performance; with the emulsion of styrene resin more than 25% by weight, the resulting anti-corrosive mixture is poor in bond and also in anti-corrosiveness.

Similarly, with the amount of asphalt emulsion less than 5% by weight (solid basis), the resulting anti-corrosive mixture is poor in anti-corrosiveness and with the amount of asphalt emulsion more than15% by weight (solid basis), the resulting anti-corrosive mixture is poor in bond.

With the amount of the inorganic powder less than 60% by weight, the resulting anti-corrosive mixture is poor in bond; and with the amount of the inorganic powder more than 90% by weight, the resulting anti-corrosive mixture is poor in anti-corrosiveness.

The inorganic powder is not specifically limited so long as it is substantially stable at the autoclaving. The inorganic powders are at least one kind of inorganic powder selected from the group consisting of silica stone, silica sand, granite, andesite, shale, kaolin, feldspar, talc, mica, fly ash, slag, iron oxide and graphite. The inorganic powder may contain limestone powder.

If the inorganic powder is incorporated with 1 to 10% by weight of limestone powder, the resulting anti-corrosive mixture provides a coating having a smooth surface and a uniform thickness, which contributes to preventing segregation of the inorganic powder and formation of pin holes, and as a result contribute to enhancement of anti-corrosiveness.

If the amount of limestone powder is less than 1% by weight, no effect is produced, and if it is more than 10% by weight, the resulting anti-corrosive mixture is poor in anti-corrosiveness.

In addition, when the inorganic powder is incorporated with a small amount of commonly used inorganic or organic inhibitor, the resulting anti-corrosive mixture is improved in anti-corrosiveness.

The anti-corrosive mixture for reinforcing steel bars of this invention can be used in the original condition or after dilution with water to a proper consistency. Reinforcing steel bars (2 mm or 5,5 mm in diameter) are dipped in the anti-corrosive mixture in the form of slurry, followed by drying. Repeating this step twice forms a coating having a thickness of about 200 μm on the average. The coating does not crack when the coated bar is bent 45°.

The treated reinforcing steel bars exhibit good bond and anti-corrosiveness. The test is carried out as follows: The treated steel bars are set in a mould, an ordinary raw mix for ALC is poured into the mould and allowed to become half-plastic. After succeeding autoclaving, the ALC is cut in such a way that the steel bars are contained in it. Bond is evaluated by pushing-out method, and anti-corrosiveness is examined according to JIS A 5416.

In this test, the bond was 20 to 26 kg/cm², which is sufficiently higher than the desired value of 15 kg/cm²; and the rust area (anti-corrosiveness) was 0 to 1,0%, which is much smaller than the maximum permissible value 5% in JIS A 5416.

The invention is now described in more detail with reference to the following examples.

EXAMPLE 1

Five kinds of anti-corrosive mixtures were prepared by mixing the ingredients for 30 minutes according to the following formulations:
(a) 3 to 25% by weight (solid basis) of aqueous latex of high-styrene SBR ("CROSLENE SPX-1", a product of Takeda Chemical Industries Co., Ltd.) containing 70 wt % of polymerized styrene in the solid and 45 wt % of solid in the latex.
(b) 3 to 20% by weight (solid basis) of aqueous asphalt emulsion ("FLINTKOTE" No. 5, a product of Shell Petrochem Co., Ltd) containing 55% of solid.
(c) 70 to 80% by weight of silica stone powder made by Tokai Kogyo Co., Ltd.
(d) 0,5% by weight of dispersing agent ("MIGHTY 150R", a product of Kao Co., Ltd.)
(e) 0,1% by weight of anti-foaming agent ("ANTI-FROTH", a product of Daiichi Kogyo Seiyaku Co., Ltd.)
(f) 10% by weight of additional water based on the sum of solid.
(g) Slaked lime powder (reagent grade, class 1) in an amount sufficient to adjust the slurry to pH 12,5.

In the thus prepared anti-corrosive mixture were dipped reinforcing steel bars 5,5 mm in diameter, followed by drying with hot air at 80° C. The dipping and drying processes were repeated. Thus an anti-corrosive coating having an average thickness of 200 μm was formed on the reinforcing steel bars.

After the coated reinforcing steel bars were fixed in a mould, ALC having a specific gravity of 0,5 was produced in the usual way. A specimen of dimensions of 4×4×16 cm was cut out of the ALC in such a way that the reinforcing bar is located in the center of cross section and parallel to the longitudinal direction of the prismatic specimen. This specimen was examined for bond by the pushing-out method and for anti-corrosiveness according to JIS A 5416.

The anti-corrosive mixture was also examined for pot life by storing it in two ways for 1 month. That is, the anti-corrosive mixture was allowed to stand in a sealed container; and also it was stored with partial renewal by removing 10% of stored mixture and replenishing 10% of fresh anti-corrosive mixture every day. After storage for the prescribed period, the viscosity change, gelation, and settling were observed. The stored anti-corrosive mixture was examined for bond and anti-corrosiveness by preparing reinformed ALC samples.

The coated reinforcing steel bars not embedded in ALC were also cured in an autoclave and then bent 45° to observe if crack occurs.

The results are shown in Table 1 in comparison with Comparative Examples.
Note to the table.
Pot life:
O: No change occurs after storage for 1 month or more, or slight settling occurs but it is easily dispersed again by agitation.
Δ: Gelation occurs after storage for 10 to 30 days, or settling occurs and it can not be dispersed again by agitation.

X: Gelation occurs after storage for less than 10 days, or settling occurs and it can not be dispersed again by agitation.

Flexibility:
O: No crack occurs when the bar is bent 45°.
X: Crack occurs when the bar is bent 45°.

Bond (Value obtained by dividing the maximum load of pushing-out by the surface area of the reinforcing steel bar):
O: greater than 20 kg/cm$^2$
Δ: 15 to 20 kg/cm$^2$
X: less than 15 kg/cm$^2$ Anti-corrosiveness:
⊚: Rusted area less than 0,5%
O: Rusted area less than 2,0%
X: Rusted area greater than 2,0%

It is noted from Table 1 that good results were produced in all the tests in Example 1; and those in tests in Comparative Example were found unsatisfactory in almost all the requirements.

EXAMPLE 2

An anti-corrosive mixture was prepared in the same manner as in Example 1, except that the amount of the aqueous latex and asphalt emulsion were changed and the silica stone powder was replaced by kaolin powder as follows:

(a) 15% by weight (solid basis) of mixed aqueous latex composed of an aqueous latex (50 wt % solid) of polystyrene resin and an aqueous latex (50 wt % solid) of SBR resin containing 50 wt % of polymerized styrene.

(b) 10% by weight (solid basis) of aqueous asphalt emulsion.

(c) 75% by weight of kaolin powder (reagent grade, class 1)

The resulting anti-corrosive mixture was examined for its performance in the same manner as in Example 1 by coating reinforcing steel bars of 2 mm in diameter. It produced good results, meeting all the requirements.

EXAMPLE 3

Four anti-corrosive mixtures were prepared in the same manner as in Example 1, with following exceptions.

(a) 5 to 40% by weight (solid basis) of mixed aqueous emulsion composed of styrene-acrylonitrile emulsion, polystyrene emulsion and asphalt emulsion in the ratio of 1:1:1 by weight (solid basis).

(b) The remainder of the solid is silicastone powder.

(c) The pH adjusting agent is not added.

The resulting anti-corrosive mixtures were examined for bond and anti-corrosiveness in the same manner as in Example 1. The results are shown in Table 2.

It is noted from Table 2 that the upper limit of silicastone powder is 90% by weight, and the best results are obtained with about 80% by weight.

EXAMPLE 4

Five anti-corrosive mixtures were prepared in the same manner as in Example 1, with following exceptions.

(a) 20% of the emulsion mixture of the same formulation as in Example 3.

(b) The inorganic substance is limestone powder and feldspar fine powder.

The resulting anti-corrosive mixtures were examined for bond and anti-corrosiveness in the same manner as in Example 1, except that the coating thickness was 150 μm. The results are shown in Table 3.

It is noted from Table 3 that a proper amount of limestone powder as a portion of the inorganic powder improved the anti-corrosiveness. However, an excess amount of limestone powder produces a contrary result as in Test No. 5.

As mentioned above, the anti-corrosive mixture of this invention has many advantages. It can be applied to reinforcing steel bars of any size. It produces a sufficient anti-corrosive effect with a coating thickness of 150 to 200 μm. It has a long pot life. It causes no safety and hygiene problems because of absence of noxious organic solvents. It is less expensive than the conventional ones.

TABLE 1

| Formulation (wt %) | Test No. in Example | | | | | Formulation (wt %) | Test No. in Comparative Example | | | | |
|---|---|---|---|---|---|---|---|---|---|---|---|
| | 1 | 2 | 3 | 4 | 5 | | 1 | 2 | 3 | 4 | 5 |
| CROSLENE SPX-1* | 5 | 10 | 15 | 20 | 25 | CROSLENE SPX-1* | 3 | 30 | 20 | 15 | 0 |
| FLINTKOTE No. 5* | 15 | 10 | 5 | 10 | 5 | FLINTKOTE No. 5* | 25 | 20 | 3 | 20 | 30 |
| Silicastone powder | 80 | 80 | 80 | 70 | 70 | Ordinary portland cement | 0 | 0 | 0 | 35 | 30 |
| Additional water | 10 | 10 | 10 | 10 | 10 | Silicastone powder | 72 | 50 | 77 | 30 | 40 |
| Test results | | | | | | Additional water | 10 | 10 | 10 | 10 | 10 |
| Pot life | O | O | O | O | O | Test results | | | | | |
| Flexibility | O | O | O | O | O | Pot life | O | O | O | X | X |
| Bond | O | O | O | O | O | Flexibility | O | Δ | Δ | Δ | Δ |
| Anti-corrosion | ⊚ | ⊚ | ⊚ | ⊚ | ⊚ | Bond | X | Δ | O | O | Δ |
| | | | | | | Anti-corrosion | O | X | X | O | O |

*solid basis

TABLE 2

| | Formulation (wt %, solid basis) | | Test results | |
|---|---|---|---|---|
| Test No. | Emulsion mixture | Silicastone powder | Anti-corrosion | Bond |
| 1 | 5 | 95 | X | O |
| 2 | 10 | 90 | O | O |
| 3 | 20 | 80 | ⊚ | O |
| 4 | 40 | 60 | ⊚~O | O |

TABLE 3

| | Formulation (wt %, solid basis) | | Test results | | |
|---|---|---|---|---|---|
| Test No. | Limestone powder | Feldspar powder | Anti-corrosion | Bond | Flexibility |
| 1 | 0 | 80 | O | O | O |
| 2 | 1.5 | 78.5 | ⊚ | O | O |
| 3 | 5 | 75 | ⊚ | O | O |
| 4 | 10 | 70 | O | O | O |

TABLE 3-continued

| | Formulation (wt %, solid basis) | | Test results | | |
|---|---|---|---|---|---|
| Test No. | Limestone powder | Feldspar powder | Anti-corrosion | Bond | Flexibility |
| 5 | 12 | 68 | X | Δ | X |

We claim:

1. A method for the manufacture of reinforced steam cured light-weight aerated concrete, comprising preparing an aqueous expandable and solidifiable slurry comprising one or more hydraulic binders and one or more silica-containing materials, inserting reinforcing steel bars into a mould, casting the slurry in said mould, permitting the cast body to expand and to solidify, optionally cutting up the solidified body into smaller pieces and then steam curing the cast body or smaller pieces, if any, said reinforcing steel bars having been treated with an anti-corrosive composition which consists essentially of (a) a mixture of 5 to 25% by weight (solid basis) of one or more kinds of aqueous emulsions or aqueous latices of styrene resin and 5 to 15% by weight (solid basis) of an aqueous emulsion of asphalt and (b) 60 to 90% by weight of at least one kind of inorganic powder selected from the group consisting of silica stone, silica sand, granite, andesite, shale, kaolin, feldspar, talc, mica, fly ash, slag, iron oxide and graphite.

2. A method as claimed in claim 1, wherein the aqueous latex of styrene resin is a mixture of an aqueous latex of polystyrene resin and an aqueous latex of styrene-butadiene resin.

3. A method as claimed in claim 1, wherein the aqueous latex of styrene resin is an aqueous latex of high styrene SBR containing 65 to 75% by weight of styrene, or an aqueous latex of styrene-butadiene modified and cured with an unsaturated carboxylic acid.

4. A method as claimed in claim 1, wherein the anti-corrosive mixture comprises (a) a mixture composed of 5 to 25% by weight (solid basis) of one or more kinds of aqueous emulsions or aqueous latices of styrene resin and 5 to 15% by weight (solid basis) of aqueous emulsion of asphalt, and (b) 60 to 90% by weight of at least one kind of inorganic powder selected from the group consisting of silica stone, silica sand, granite, andesite, shale, kaolin, feldspar, talc, mica, fly ash, slag, iron oxide and granite, including 1 to 10% by weight of limestone.

5. A method as claimed in claim 4, wherein the aqueous latex of styrene resin is a mixture of an aqueous latex of polystyrene resin and an aqueous latex of styrene-butadiene resin.

6. A method as claimed in claim 4, wherein the aqueous latex of styrene resin is an aqueous latex of high styrene SBR containing 65 to 75% by weight of styrene, or an aqueous latex of styrene butadiene modified and cured with an unsaturated carboxylic acid.

* * * * *